US009735643B2

United States Patent
Yamasaki (10) Patent No.: US 9,735,643 B2
(45) Date of Patent: Aug. 15, 2017

(54) ROTATING ELECTRIC MACHINE WITH SEAMLESS COVER AND LID SECTION

(71) Applicant: DENSO CORPORATION, Kariya, Aichi-pref. (JP)

(72) Inventor: Masashi Yamasaki, Obu (JP)

(73) Assignee: DENSO CORPORATION, Kariya (JP)

( * ) Notice: Subject to any disclaimer, the term of this patent is extended or adjusted under 35 U.S.C. 154(b) by 361 days.

(21) Appl. No.: 14/525,548

(22) Filed: Oct. 28, 2014

(65) Prior Publication Data

US 2015/0115754 A1 Apr. 30, 2015

(30) Foreign Application Priority Data

Oct. 30, 2013 (JP) ................................. 2013-225289

(51) Int. Cl.
*H02K 5/10* (2006.01)
*H02K 5/22* (2006.01)
*H02K 5/04* (2006.01)
*H02K 11/33* (2016.01)

(52) U.S. Cl.
CPC ................. *H02K 5/10* (2013.01); *H02K 5/04* (2013.01); *H02K 5/225* (2013.01); *H02K 11/33* (2016.01)

(58) Field of Classification Search
CPC H02K 5/10; H02K 5/04; H02K 5/225; H02K 11/33
USPC .............................................. 310/71, 91, 418
See application file for complete search history.

(56) References Cited

U.S. PATENT DOCUMENTS

2013/0257193 A1 10/2013 Toda et al.

FOREIGN PATENT DOCUMENTS

| JP | 53-37206 | | 9/1978 | |
|---|---|---|---|---|
| JP | 5337206 | * | 9/1978 | ............... H02K 5/10 |
| JP | 2007-185055 | | 7/2007 | |
| JP | 2007185055 A | * | 7/2007 | ............... H02K 5/10 |
| JP | 2013-090376 | | 5/2013 | |
| JP | 2013-090377 | | 5/2013 | |
| JP | 2015-55201 | | 3/2015 | |

OTHER PUBLICATIONS

Machine translation of JP 2007185055 A (Jul. 2007).*
Machine translation of JP5337206 (Sep. 1978).*
U.S. Appl. No. 14/525,565, filed Oct. 28, 2014, Rotating Electric Machine.
Office Action (3 pages) dated Sep. 1, 2015, issued in corresponding Japanese Application No. 2013-225289 and English translation (4 pages).
Yamasaki et al., U.S. Appl. No. 14/525,565, filed Oct. 28, 2014.

* cited by examiner

*Primary Examiner* — Michael Andrews
(74) *Attorney, Agent, or Firm* — Nixon & Vanderhye P.C.

(57) ABSTRACT

A rotating electric machine includes a motor section and a controller section. The motor section includes an annular stator, a winding wire wound on the stator, and a rotor rotatably disposed inside the stator. The controller section is positioned in an axially non-overlapping position with the stator and controls an electric power supply to the winding wire for a drive control of the motor section. The rotating electric machine also includes a cover having a cylindrical shape which seamlessly covers the controller section and the motor section. The rotating electric machine further includes a lid section for sealing of an end part of the cover. As a result, the rotating electric machine is sealed from dust and water.

6 Claims, 9 Drawing Sheets

ROTATING ELECTRIC MACHINE WITH SEAMLESS COVER AND LID SECTION

CROSS REFERENCE TO RELATED APPLICATION

The present application is based on and claims the benefit of priority of Japanese Patent Application No. 2013-225289, filed on Oct. 30, 2013, the disclosure of which is incorporated herein by reference.

TECHNICAL FIELD

The present disclosure generally relates to a rotating electric machine having a seamless body that contains a motor section and a controller section.

BACKGROUND INFORMATION

Conventionally, a rotating electric machine includes a motor section and a controller section that controls the motor section. For example, in the rotating electric machine disclosed in a patent document 1 (i.e., Japanese Patent Laid-Open No. 2013-90376), the controller section is positioned in an area outside of the stator of the motor section in an axial direction. The positioning of the controller section outside of the stator in the axial direction may also be described as axially non-overlapping with the stator of the motor section along an axis of the rotating electric machine. In other words, the controller section and the motor section do not share a range of axial coordinates.

In the rotating electric machine of the patent document 1, the motor case is covered by a cylindrical shaped motor case, and the controller section is covered by a cylindrical shaped cover, respectively, for preventing the intrusion of dust, water and the like into those sections, together with the prevention of rust generation. However, in the rotating electric machine of the patent document 1, covering the motor section and the controller section separately is not dust-proof and water-proof. Dust, water, etc., may intrude into the controller section and/or the motor section through a gap between the motor case and the cover. When dust or water intrudes into the controller section or the motor section, the controller section and/or the motor section may malfunction or rust may be generated therein on a metal part.

Thus, by disposing an annular sealing member at the joint of the motor case and the cover in the rotating electric machine of the patent document 1, air-tightness and water-tightness are maintained at a gap between the motor case and the cover. However, when the sealing member is disposed at such position, the manufacturing cost of the rotating electric machine may increase. Further, even when a sealing member is disposed, a gap still exists between the motor case and the cover, which leaves a possibility of dust/water intrusion.

Further, an opening is formed at a predetermined position of an end/edge of the cover of the controller section, and the opening of the cover is sealed by a resin-made connector that is glued thereon. In such configuration, when glue used to seal a gap between the connector and the opening of the cover is not sufficiently sealed, dust, water, etc., may intrude into the controller section through the gap between the connector and the cover.

Thus, in the rotating electric machine of the patent document 1, there are many outside-inside "communication" portions that allow intrusion of dust and/or water into the rotating electric machine (i.e., the joint between the motor case and the cover, the opening around the connector, etc.), and providing protection against dust, water, rust and the like may only be achieved at an increased cost.

SUMMARY

It is an object of the present disclosure to provide a rotating electric machine to prevent intrusion of dust and water.

In an aspect of the present disclosure, the rotating electric machine is provided with a motor section, a shaft, a controller section, a cover, and a lid section.

The motor section has an annular stator, a winding wire wound around the stator, and a rotor rotatably disposed inside the stator. The shaft is provided at a center of rotation of the rotor. The controller section is disposed in an axially non-overlapping position with the stator of the motor section, and controls a drive of the motor section by controlling a supply of an electric power to the winding wire. The cover extends in an axial direction of the stator, and seamlessly covers the controller section and the motor section with its cylindrical shape. The lid section is provided on the opposite side of the controller section that is opposite to the motor section, to seal an end of the cover.

Further, in the present disclosure, a first frame is disposed inside of the cover at a position between the motor section and the controller section, a second frame is disposed on an opposite side of the motor section relative to the first frame, in which the motor section is interposed between the first and second frames, and a bolt that is inserted into and extends through at least one of the first and second frames to fasten the first frame to the second frame, such that the bolt has at least one axial end positioned inside the cover.

In addition, in the present disclosure, the rotating electric machine also includes a through hole that extends through the first frame to allow communication between a controller section side surface of the first frame and a motor section side surface of the first frame, and a concave part formed on a motor section side surface of the second frame. The bolt is inserted into the through hole and an end of the bolt is screw-fastened into the concave part to fasten the first frame to the second frame.

Even further, in the present disclosure, the rotating electric machine includes at least one of a power supply wire harness extending from the lid section in an opposite direction that is opposite to the controller section, for the power supply wire harness supplying an electric power for to the winding wire, or connection section connected to a control wire harness that transmits a signal to the controller section.

Additionally, in the present disclosure, the connector section and the lid section are seamlessly formed into a single body from resin.

In the present disclosure, the cover extends in an axial direction of the stator, and seamlessly covers the controller section and the motor section. That is, for example, no gap space, such as a joint, is formed at a position between the controller section and the motor section in the middle of an axially-extending cover. Therefore, under the cover of such seamlessly-formed cover, intrusion of dust, water, etc., into the motor section and the controller section is effectively prevented. Further, in comparison to the separate covering of the conventional art that uses two separate parts for the covering of the motor section and the controller section, the number of parts is decreased, and the structure of the rotating electric machine is simplified. Therefore, dust/water/rust-proof character of the motor section and the controller section is provided by the present disclosure with simpler configuration. Thus, without causing a manufacturing cost increase, while controlling malfunction of the motor section and the controller section, rust generation in the motor section and the controller section is prevented.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Hereafter, the rotating electric machine in multiple embodiments of the present disclosure and the electric power steering device using the same are described with reference to the drawing. In those embodiments, the same numerals are assigned to the same configuration part, and explanation of the same part is omitted. Further, for the ease of viewing, the numeral may be assigned to only one of the similar configuration parts.

First Embodiment

Figure 1:
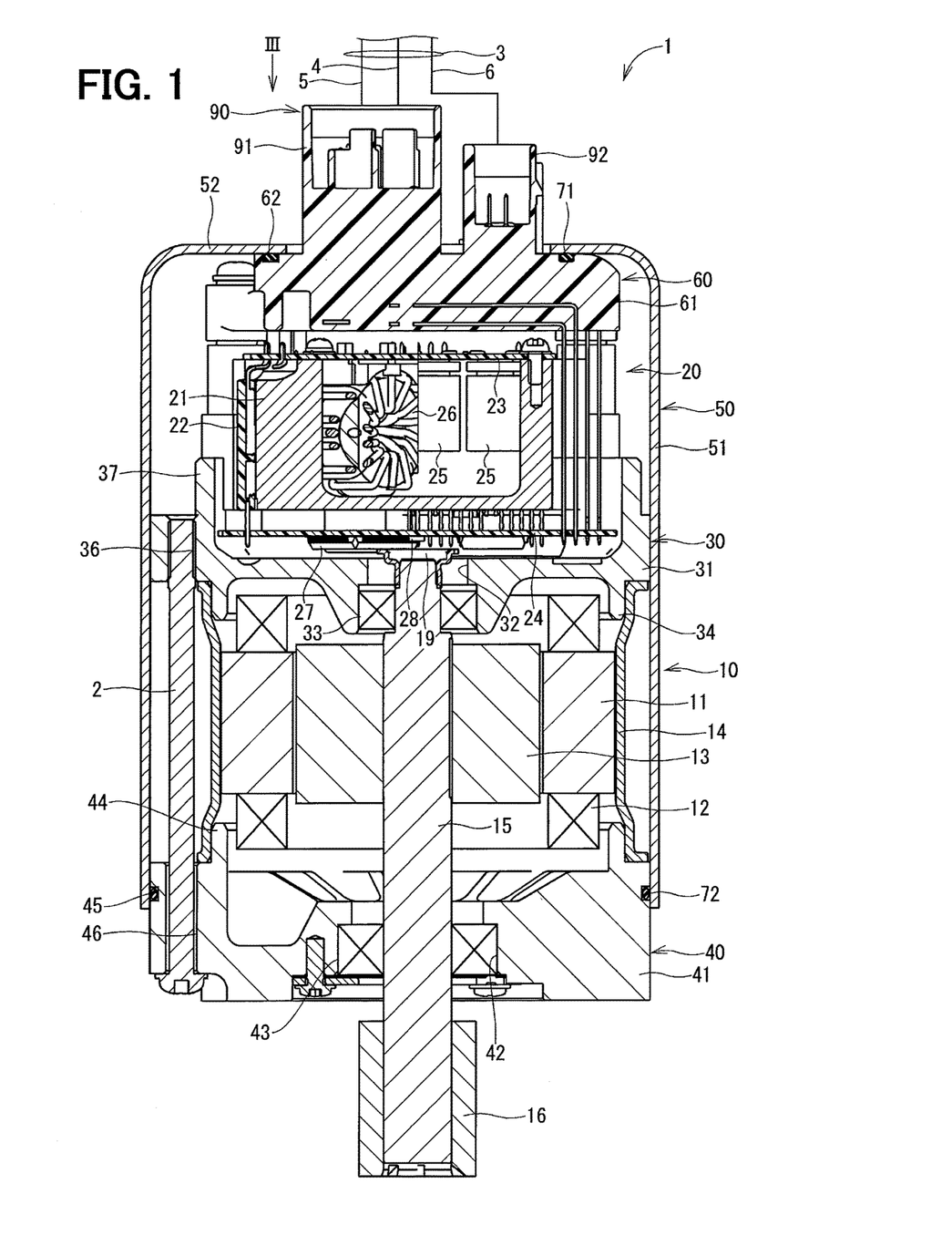
FIG. 1 is a sectional view of a rotating electric machine in a first embodiment of the present disclosure.

The rotating electric machine in the first embodiment of the present disclosure is shown in FIG. 1. The rotating electric machine 1 is driven by receiving an electric power supply, for example, and is used as an electric power steering device for assisting a steering operation of a vehicle.

Figure 2:
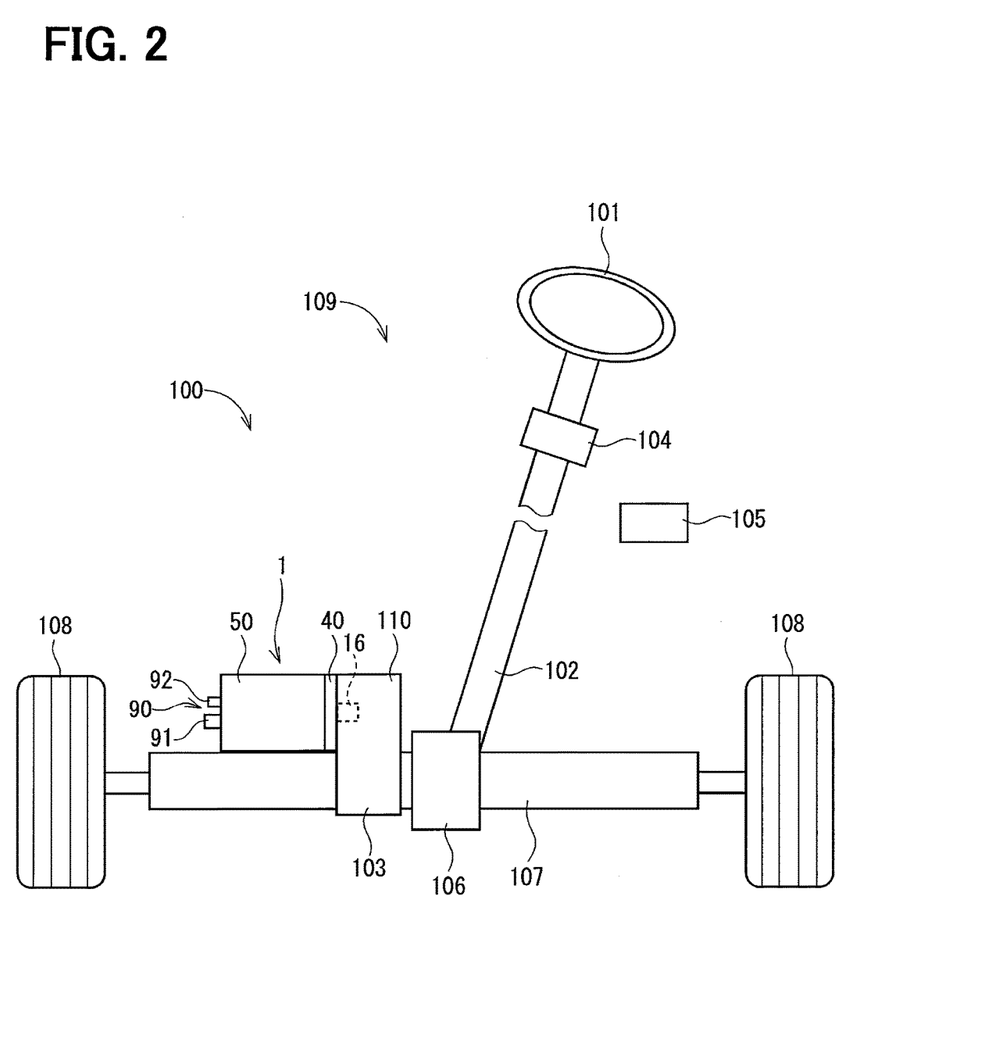
FIG. 2 is an illustrative diagram of the rotating electric machine in the first embodiment of the present disclosure being applied to an electric power steering device.

FIG. 2 shows an entire configuration of a steering system 100 having an electric power steering device 109. In the electric power steering device 109, a torque sensor 104 is disposed on a steering shaft 102 that is connected to a steering wheel 101. The torque sensor 104 detects a steering torque that is inputted to the steering shaft 102 via the steering wheel 101 from a driver.

A pinion gear 106 is disposed at a tip of the steering shaft 102, and the pinion gear 106 engages a rack shaft 107. On both ends of the rack shaft 107, a pair of tires 108 is steered via a tie rod.

In such configuration, when the driver rotates the steering wheel 101, the steering shaft 102 connected to the steering wheel 101 rotates, and a rotational movement of the steering shaft 102 is converted into a linear movement of the rack shaft 107 by the pinion gear 106, and the pair of tires 108 are steered by an angle according to an amount of straight movement of the rack shaft 107.

The electric power steering device 109 is provided with the rotating electric machine 1 which generates a steering-assist torque and a speed reduction gear 103 which slows down a rotation speed of the rotating electric machine 1 and transmits the rotation to the rack shaft 107, together with other parts. According to the present embodiment, the rotating electric machine 1 is attached to a housing 110 of the speed reduction gear 103.

The rotating electric machine 1 is a three-phase-circuit drive type brushless motor, and is driven by receiving an electric power supply from a battery which is not illustrated, for example. The rotating electric machine 1 rotates the speed reduction gear 103, which is a driving object, in a normal rotation direction and in a reverse rotation direction. The electric power steering device 109 contains the above-mentioned torque sensor 104 and a speed sensor 105 which detects the vehicle speed.

In such configuration, the electric power steering device 109 generates the steering assist torque for assisting a steering of the steering wheel 101 from the rotating electric machine 1 based on the signal from the torque sensor 104 and the speed sensor 105 etc., and transmits it to the rack shaft 107 via the speed reduction gear 103. Thus, in the present embodiment, the electric power steering device 109 is a rack assist type electric power steering device.

As shown in FIGS. 1 and 3-5, the rotating electric machine 1 includes a motor section 10, a shaft 15, a controller section 20, a first frame 30, a second frame 40, a bolt 2, a cover 50, a lid section 60, and a connector 90 and the like.

The motor section 10 has a stator 11, a winding wire 12, a rotor 13, a motor case 14 and the like. The stator 11 is formed approximately in a cylindrical shape with metal, such as iron, for example.

The winding wire 12 is formed with metal, such as copper, for example, and is wound around the stator 11. The rotor 13 is formed approximately in a cylindrical shape with metal, such as iron, for example. The magnet which is not illustrated is disposed on an outer wall of the rotor 13. The rotor 13 is coaxially disposed with the stator 11 in an inside of the stator 11.

The motor case 14 is formed approximately in a cylindrical shape with metal, for example. The stator 11 is accommodated in the motor case 14 in a fixed manner.

The shaft 15 is formed in a rod shape with metal, for example, and is disposed at the center of the rotor 13 to have one body with the rotor 13.

As shown in FIG. 1, the controller section 20 is disposed in an axial outside area of the stator 11 of the motor section 10, and controls a drive of the motor section 10 by controlling an electric power supply to the winding wire 12. The controller section 20 is described later in full detail.

As shown in FIG. 1, the first frame 30 is provided at a position between the motor section 10 and the controller section 20. The first frame 30 has a frame body 31, a cylinder part 34, a cylinder part 37 and the like.

The frame body 31 is formed substantially in a circle disk shape with metal, for example. A through hole 32 which pierces through the frame body 31 along a board thickness direction is disposed at the center of the frame body 31. In an inside of the hole 32 concerned, a bearing member 33 is disposed coaxially with the frame body 31.

The cylinder part 34 extends from a motor side surface of the frame body 31 in a cylindrical shape along a board thickness direction.

A through hole 36 which pierces through the frame body 31 along a board thickness direction is formed on an outer periphery of the frame body 31. That is, the through hole 36 is formed to connect a controller side surface of the frame body 31 and the motor side surface of the frame body 31. According to the present embodiment, the through hole 36 is formed at three positions along a periphery of the frame body 31.

The cylinder part 34 extends from a controller side surface of the frame body 31 in a cylindrical shape along a board thickness direction.

The first frame 30 is disposed to have the cylinder part 34 positioned in an inside of one end of the motor case 14, and is configured to seal the one end of the motor case 14.

As shown in FIG. 1, the second frame 40 is disposed on an opposite side of the motor section 10 relative to the first frame 30, and a positioning/arrangement of the first and second frames is interposed with the motor section 10. In other words, the motor section is interposed between the first and second frames. The second frame 40 has a frame body 41, a cylinder part 44 and the like.

The frame body 41 is formed approximately in a cylindrical shape with metal, for example. A hole 42 which pierces through the frame body 41 along a board thickness direction is disposed at the center of the frame body 41. In an inside of the hole 42, a bearing member 43 is disposed coaxially with the frame body 41.

The cylinder part 44 extends from the motor side surface of the frame body 41 along a board thickness direction.

A through hole 46 which pierces through the frame body 41 along a board thickness direction is disposed on an outer periphery of the frame body 41. According to the present embodiment, the through hole 46 is disposed at three positions along a periphery of the frame body 41 in a corresponding manner to the through hole 36.

The second frame 40 has the cylinder part 44 positioned in an inside of other end of the motor case 14, and the other end of the motor case 14 is sealed by the second frame 40.

The bolt 2 is inserted into the through hole 46 of the second frame 40 so that the first frame 30 and the second frame 40 are fastened together by the bolt 2. Here, one end (i.e., a head) of the bolt 2 is stopped on one side of the frame body 41, which is opposite to the cylinder part 44, and the other end (i.e., an opposite end relative to the head) of the bolt 2 is screw-fastened into the through hole 36 of the frame body 31. Thereby, the bolt 2 exerts a predetermined axial force to a fastening portion on the first and second frames 30, 40, i.e., to a position where the first frame 30 and the second frame 40 are fastened by the bolt 2, at which the motor case 14 is held in a bound state in between the two frames.

As shown in FIG. 1, the shaft 15 is supported by a bearing member 33 on one end, and is supported by a bearing member 43 by other end. Thereby, the shaft 15 and the rotor 13 are supported by the first frame 30 and the second frame 40, and they are rotatable in an inside of the stator 11. Here, the other end of the shaft 15 protrudes from to the frame body 41 of the second frame 40, toward an opposite side relative to the motor section 10.

An output end 16 is disposed on the other end of the shaft 15. The output end 16 is formed with metal, for example, and is rotatably disposed together with the shaft 15. The output end 16 engages the speed reduction gear 103 so that an input part of the speed reduction gear 103 is connected thereto, and outputs a rotation of the rotor 13 and the shaft 15 to the speed reduction gear 103 (refer to FIG. 2).

A magnet 19 is disposed on one end of the shaft 15. The magnet 19 is disposed to be rotatable together with the shaft 15 on an opposite side of the frame body 30 relative to the motor section 10.

The cover 50 is formed from metal, for example, and has a cover body 51, an inner annular part 52 and the like.

The cover body 51 is seamlessly formed in a cylindrical shape to cover both of the controller section 20 and the motor section 10, with one end extending up to the second frame 40 along an axial direction of the stator 11. The inner annular part 52 is formed in an annular/ring shape to extend in a radial inward direction from the other end of the cover body 51. One end of the cover body 51 abuts an outer wall of the frame body 41 of the second frame 40 at a radial outside of the body 41. Here, the first frame 30 is positioned inside the cover body 51. As for the bolt 2, except for a portion around one end (i.e., the head), the majority of the shaft is positioned inside the cover body 51 (refer to FIG. 1).

The lid section 60 is formed with resin etc., for example, and has a lid body part 61 and the like. The lid body part 61 is formed approximately in a circular disk shape, and is disposed in an inside of the cover body 51 to seal the other end of the cover body 51, i.e., is disposed on one side of the controller section 20, or on an opposite side of the motor section 10. More specifically, the lid body part 61 is disposed on one side close to the controller section 20 relative to the inner annular part 52, for sealing an opening in an inside of the inner annular part 52 of the cover 50. Here, the controller section 20 is being fixed onto the first frame 30. Further, the lid body part 61 is being fixed onto the controller section 20.

On a periphery of an opposite side of the lid body part 61 relative to the controller section 20, an annular groove 62 is formed. In the groove 62, a sealing member 71 is disposed. The sealing member 71 is formed with an elastic material such as a rubber or the like, and is elastically deformable according to an application of an external force.

Further, an annular groove 45 is formed on an outer wall of the frame body 41. In the groove 45, a sealing member 72 is disposed. The sealing member 72 is formed with an elastic material such as a rubber or the like, similarly to the sealing member 71, and is elastically deformable according to an application of an external force.

Figure 3:
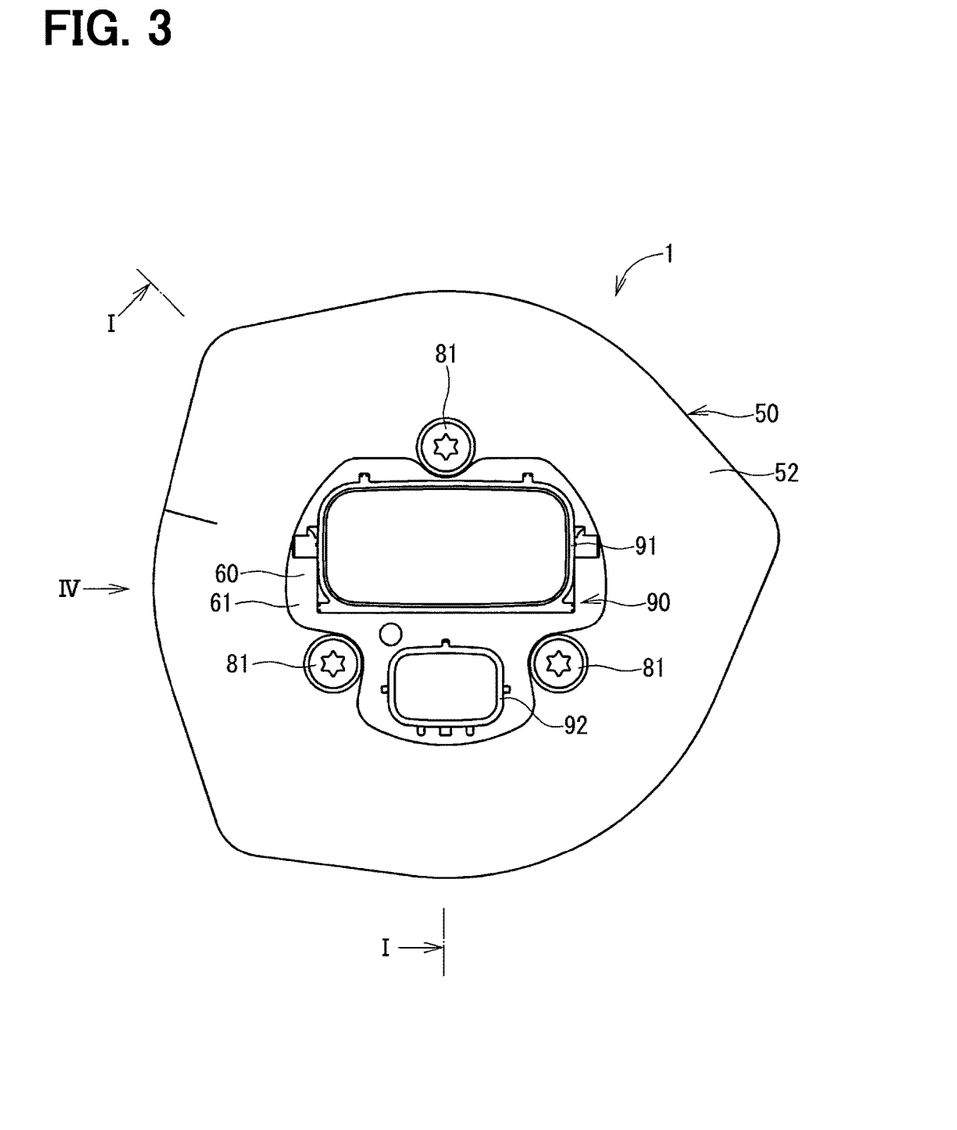
FIG. 3 is a view of the rotating electric machine in FIG. 1 along an arrow III.
Figure 4:
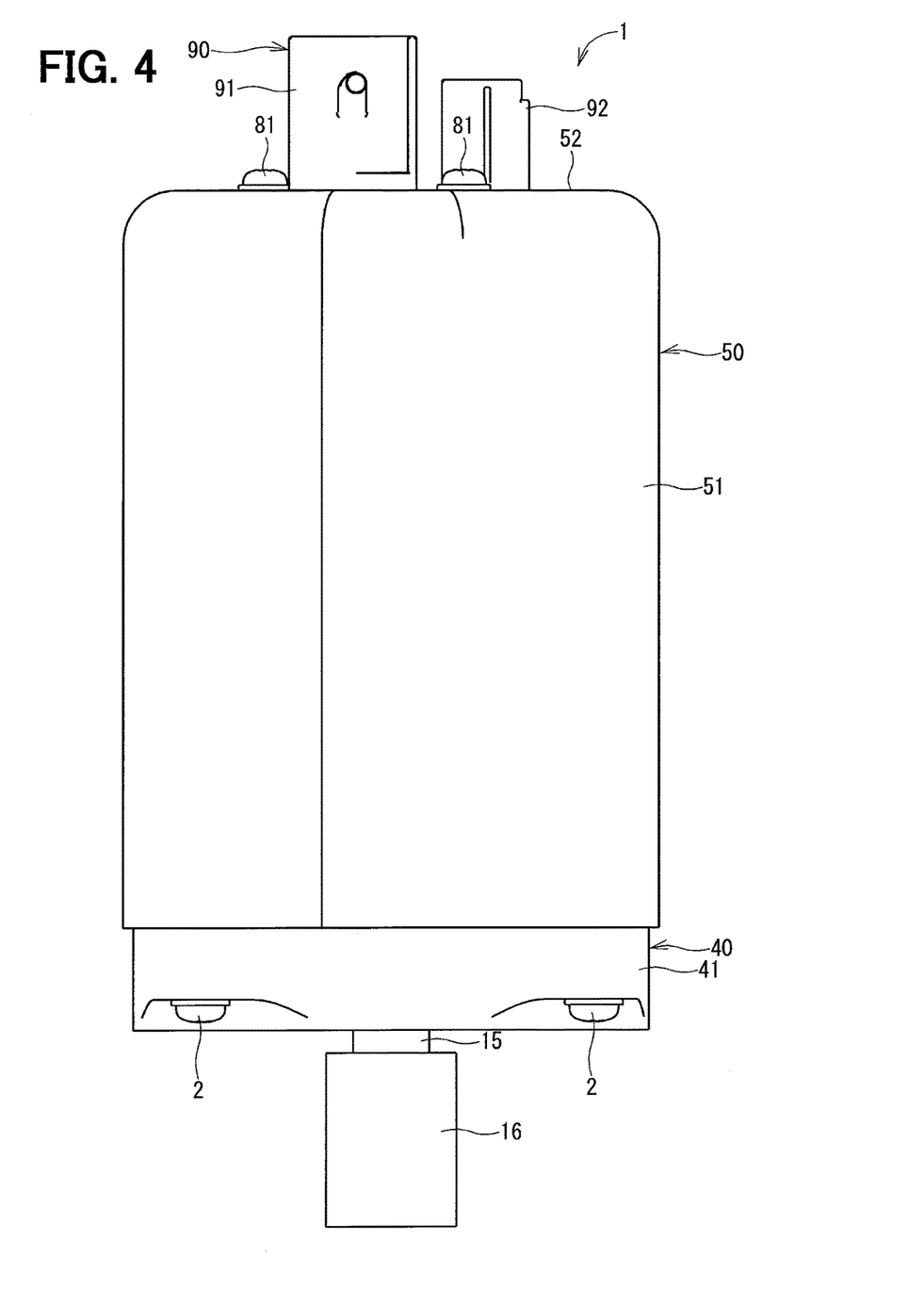
FIG. 4 is a view of the rotating electric machine in FIG. 3 along an arrow IV.
Figure 5:
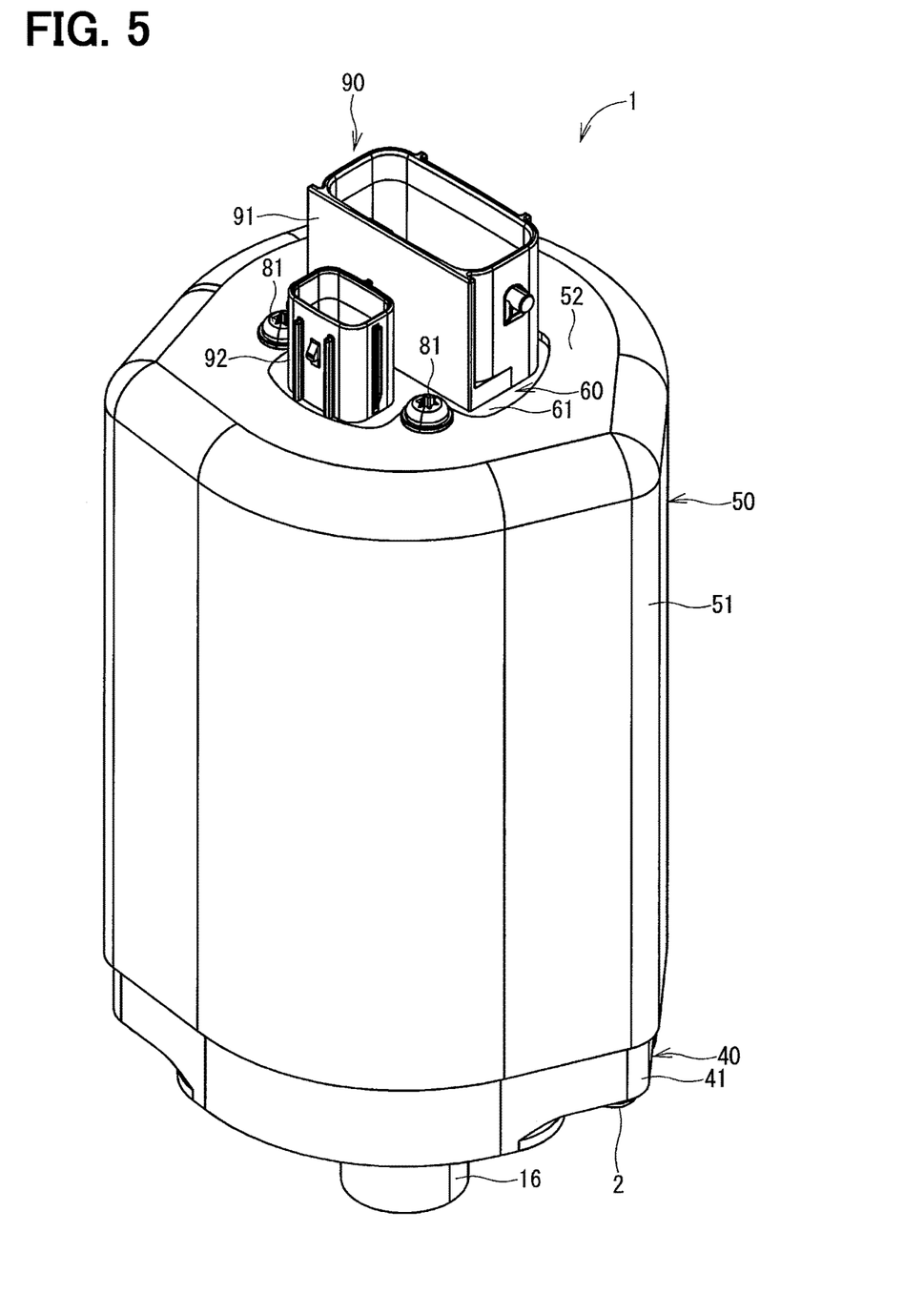
FIG. 5 is a perspective view of the rotating electric machine in the first embodiment of the present disclosure.

As shown in FIGS. 3 and 5, the cover 50 is being fixed onto the lid section 60 when the inner annular part 52 is fastened on the lid body part 61 by a the screw member 81. The screw member 81 fastens the cover 50 onto the lid section 60 by being screw-fastened into a cylinder member made of metal which is disposed in the lid body part 61 (not illustrated). According to the present embodiment, three screw members 81 are used (refer to FIG. 3). Here, the sealing member 71 is compressed by the lid body part 61 and the inner annular part 52 toward a parallel direction in parallel with an axis of the cover body 51. In such manner, the sealing member 71 provides an air-tight sealing or a water-tight sealing for a gap between the lid section 60 and the cover 50.

Further, the sealing member 72 is compressed by the frame body 41 and the cover body 51 toward a radial direction of the frame body 41. In such manner, the sealing member 72 provides an air-tight sealing or a water-tight sealing for a gap between the second frame 40 and the covers 50. Thus, in the present embodiment, the sealing members 71 and 72 provide an air-tightness and a water-tightness that separates an inside of the cover 50 from its outside.

The connector 90 has a first connector 91 and a second connector 92 which are formed with resin, etc., in one body (i.e., integrated or a single body) with the lid section 60, for example.

The first connector 91 and the second connector 92 are seamlessly formed on the lid body part 61 of the lid section 60 so that they extend in a cylindrical shape from the lid body part 61 in a direction away from the controller section 20, respectively. To the connector 90, an end of the wire harness 3 is connected. To the first connector 91, an end of an electric power wire harness 4 for supplying an electric power to the winding wire 12 and an end of a control wire harness 5 for transmitting a signal to the controller section 20 are connected. To the second connector 92, an end of a control wire harness 6 for transmitting a signal to the controller section 20 is connected. In the present embodiment, a control wire harness 6 transmits a signal from the torque sensor 104 to the controller section 20.

Next, the controller section 20 is described in detail.

As shown in FIG. 1, the controller section 20 has a heat sink 21, a semiconductor module 22, a power board 23, a control board 24, a capacitor 25, a choke coil 26, a microcomputer 27, a rotation angle sensor 28 and the like.

The heat sink 21 is formed in a closed-end box-like shape, for example with metal, such as aluminum. The heat sink 21 is fixed onto the first frame 30 so that its bottom faces the first frame 30 and its opening opposite to its bottom faces the lid section 60.

Multiple pieces of the semiconductor modules 22 are disposed so that those modules 22 abut the outer wall of the heat sink 21. The semiconductor module 22 may be a switching device, such as an IGBT, for example, for the switching of an electric power supply to the winding wire 12. By disposing the semiconductor module 22 in an abutting manner to the heat sink 21, heat of the semiconductor module 22 in operation is dissipated to air via the heat sink 21.

The power board 23 is disposed at a position between the heat sink 21 and the lid section 60 so that the opening of the heat sink 21 is sealed by the power board 23. The power board 23 is electrically connected with the semiconductor module 22. The semiconductor module 22 is electrically connected with the winding wire 12. A driving current to the winding wire 12 flows through the power board 23.

The control board 24 is disposed at a position between the heat sink 21 and the first frame 30, which is on an opposite side of the heat sink 21 relative to the power board 23. The control board 24 is electrically connected with the semiconductor module 22. The control signal which controls the semiconductor module 22 flows through the control board 24.

The capacitor 25 is accommodated in an inside of the heat sink 21. The capacitors 25 are a through-hole type electronic component, and are mounted on one side of the heat sink 21 close to the power board 23, for example. According to the present embodiment, multiple capacitors 25 are used. The capacitor 25 is used for a reduction of a ripple current in the drive electric current, i.e., for achieving a noise prevention function of the motor.

The choke coil 26 is, just like the capacitor 25, accommodated in an inside of the heat sink 21. The choke coil 26 is mounted on one side of the power board 23 close to the heat sink 21. The choke coil 26 functions as a filter, and removes a noise in an electric power supply current.

A metal terminal buried in the connector 90 is electrically connected to the power board 23 and to the control board 24.

The first connector 91 receives an electric current that is to be supplied to the winding wire 12 via the electric power wire harness 4, that is, a driving electric current. In this case, the driving electric current flows into the winding wire 12 via the first connector 91, the power board 23, and the semiconductor module 22.

Control signals to the control board 24, such as a signal from the torque sensor 104, a signal about an ignition voltage, together with a CAN signal and the like are input to the first connector 91 and to the second connector 92 via the control wire harnesses 5, 6.

The microcomputer 27 and the rotation angle sensor 28 are mounted on one side of the control board 24 facing the frame body 31, i.e., on an opposite side of the control board 24 relative to the heat sink 21.

The microcomputer 27 has a CPU as a calculating unit, a ROM and a RAM as a memory, as well as an input output unit, etc., based on the signal from the torque sensor 104, the signal about the ignition voltage, other CAN signals, etc., that are input via the connector 90, the microcomputer 27 performs various operations according to the program stored in ROM, and controls the power supply to the winding wire 12 based on a control of the semiconductor module 22. When an electric power is supplied to the winding wire 12, a rotating magnetic field is generated by the stator 11. Thereby, the rotor 13 rotates together with the shaft 15, and a rotation of the rotor 13 is outputted from the output end 16. Thus, the rotating electric machine 1 is a rotating electric machine in one body structure having a controller, in which the motor section 10 and the controller section 20 for controlling the drive of the motor section 10 are combined to have one body.

The rotation angle sensor 28 is disposed at a position corresponding to the magnet 19 on the control board 24, i.e., on an axis line of the shaft 15. The rotation angle sensor 28 detects a rotation angle of the shaft 15 and the rotor 13 by detecting the magnetic flux from the magnet 19. The rotation angle sensor 28 outputs a signal about the rotation angle of the shaft 15 and the rotor 13 to the microcomputer 27. Thereby, the microcomputer 27 controls a rotation of the rotor 13 without losing a smooth rotation cycle thereof.

As described above, in the present embodiment, the motor section 10 has an annular shape stator 11, the winding wire 12 is wound on the stator 11, and the rotor 13 is rotatably disposed in an inside of the stator 11. The shaft 15 is disposed at the center of rotation of the rotor 13. The controller section 20 is provided in an axial outside area of the stator 11, i.e., a part of the motor section 10, and controls a drive of the motor section 10 by controlling a supply of the electric power to the winding wire 12. The cover 50 extends in the axial direction of the stator 11, and the controller section 20 and the motor section 10 are seamlessly covered by the cover 50 having a cylindrical shape. The lid section 60 is disposed on the opposite side of the motor section 10 relative to the controller section 20 so that the end of the cover 50 is sealed.

Thus, in the present embodiment, the cover 50 extends in the axial direction of the stator 11, and seamlessly covers both of the controller section 20 and the motor section 10. That is, no gap spaces, such as a joint, is formed at a position between the controller section 20 and the motor section 10 in the middle of an axially-extending cover 50. Therefore, under the cover of such seamlessly-extending cover 50, intrusion of dust, water, etc., into the motor section 10 and the controller section 20 is effectively prevented.

Further, in comparison to the conventional structure that covers the motor section 10 and the controller section 20 with separate parts, the number of parts is decreased, and the structure of the rotating electric machine is simplified. Therefore, in the present embodiment, dust/water/rust-proof character of the motor section 10 and the controller section 20 is provided with simpler configuration. Therefore, without causing an increase of a manufacturing cost, while controlling malfunction of the motor section 10 and the controller section 20, rust generation in the motor section 10 and the controller section 20 is prevented.

Further, in the present embodiment, the first frame 30, the second frame 40 and the bolt 2 are used. The first frame 30 is provided at a position between the motor section 10 and the controller section 20 in an inside of the cover 50. The second frame 40 is disposed on an opposite side of the motor section 10 relative to the first frame 30, which may also be described as "binding the motor section 10 together with the first frame 30". The bolt 2 is inserted into the through hole 46 of the second frame 40 for fastening the first frame 30 and the second frame 40 together, with one axial end of the bolt 2 positioned in an inside of the cover body 51. That is, as for the bolt 2, a part of one axial end is covered with the cover body 51. Therefore, for at least a portion of the bolt 2 covered with the cover body 51, rust prevention treatment is omissible. Thereby, the manufacturing cost of the rotating electric machine 1 is reduced.

In the present embodiment, the connector 90 is further provided. The connector 90 is formed to extend from the lid section 60 and in a direction away from the controller section 20. To the connector 90, the electric power wire harness 4 for supplying the electric power to the winding wire 12, as well as the control wire harness 5 and 6 which transmit signals to the controller section 20 are connected. Thus, in the present embodiment, the connector 90 for connecting the wire harness 4 for supplying the electric power to the winding wire 12 and for connecting the control wire harness 5 and 6 which transmits signals to the controller section 20 is formed to protrude from the lid section 60 along the axial direction of the stator 11. Therefore, a dimension of the rotating electric machine 1 containing the connector 90 along a radial direction is reduced.

In the present embodiment, the connector 90 is formed seamlessly on the lid section 60 with resin. In other words, the connector 90 and the lid section 60 are seamlessly formed into a single body using resin. Therefore, the number of parts is reduced in comparison to the one that has the connector 90 and the lid section 60 made as separate parts. Further, there is no concern about water-tight and air-tight combination structure between the connector 90 and the lid section 60, which further reduces the manufacturing cost.

Second Embodiment

The rotating electric machine in the second embodiment of the present disclosure is shown in FIGS. 6-9.

Figure 6:
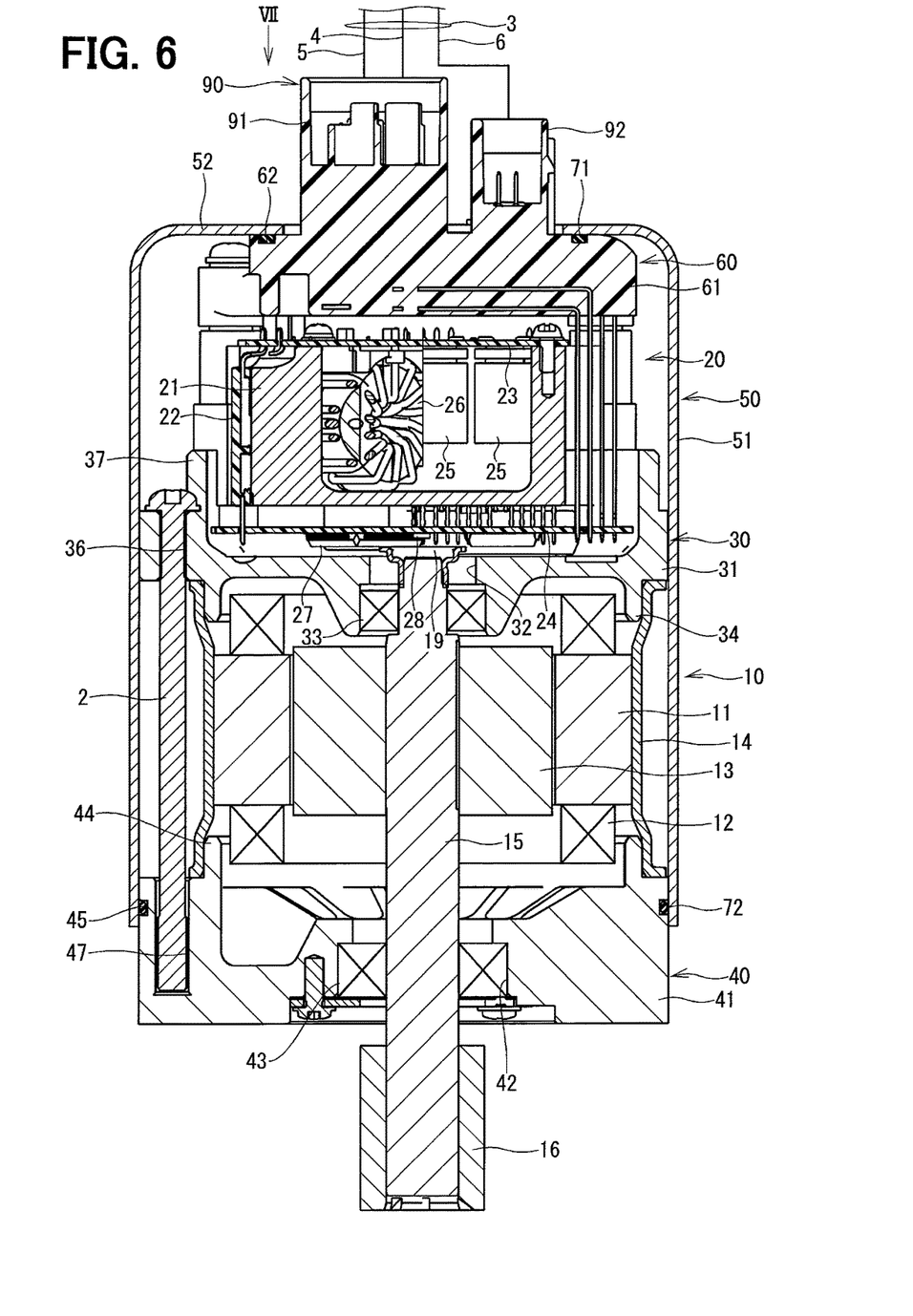
FIG. 6 is a sectional view of the rotating electric machine in a second embodiment of the present disclosure.
Figure 7:
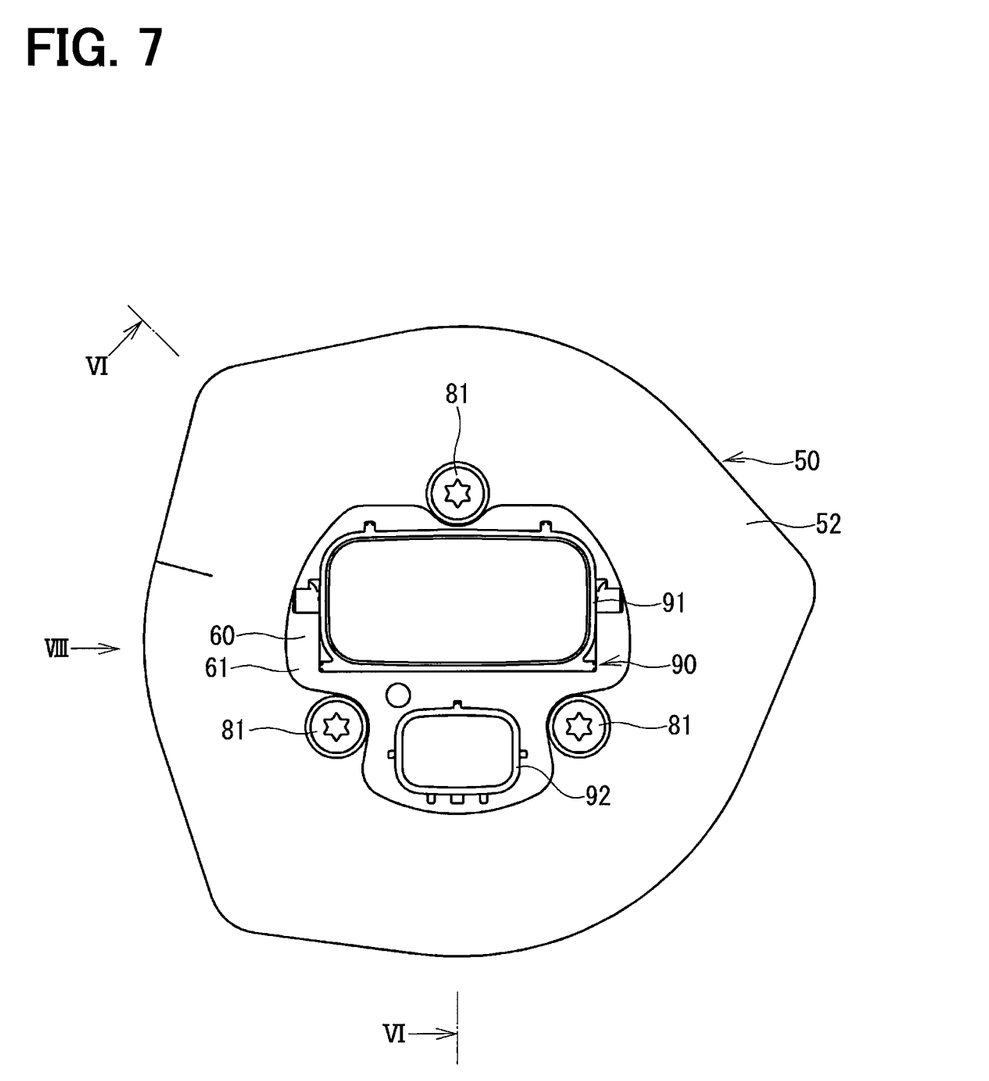
FIG. 7 is a view of the rotating electric machine in FIG. 6 along an arrow VII.
Figure 8:
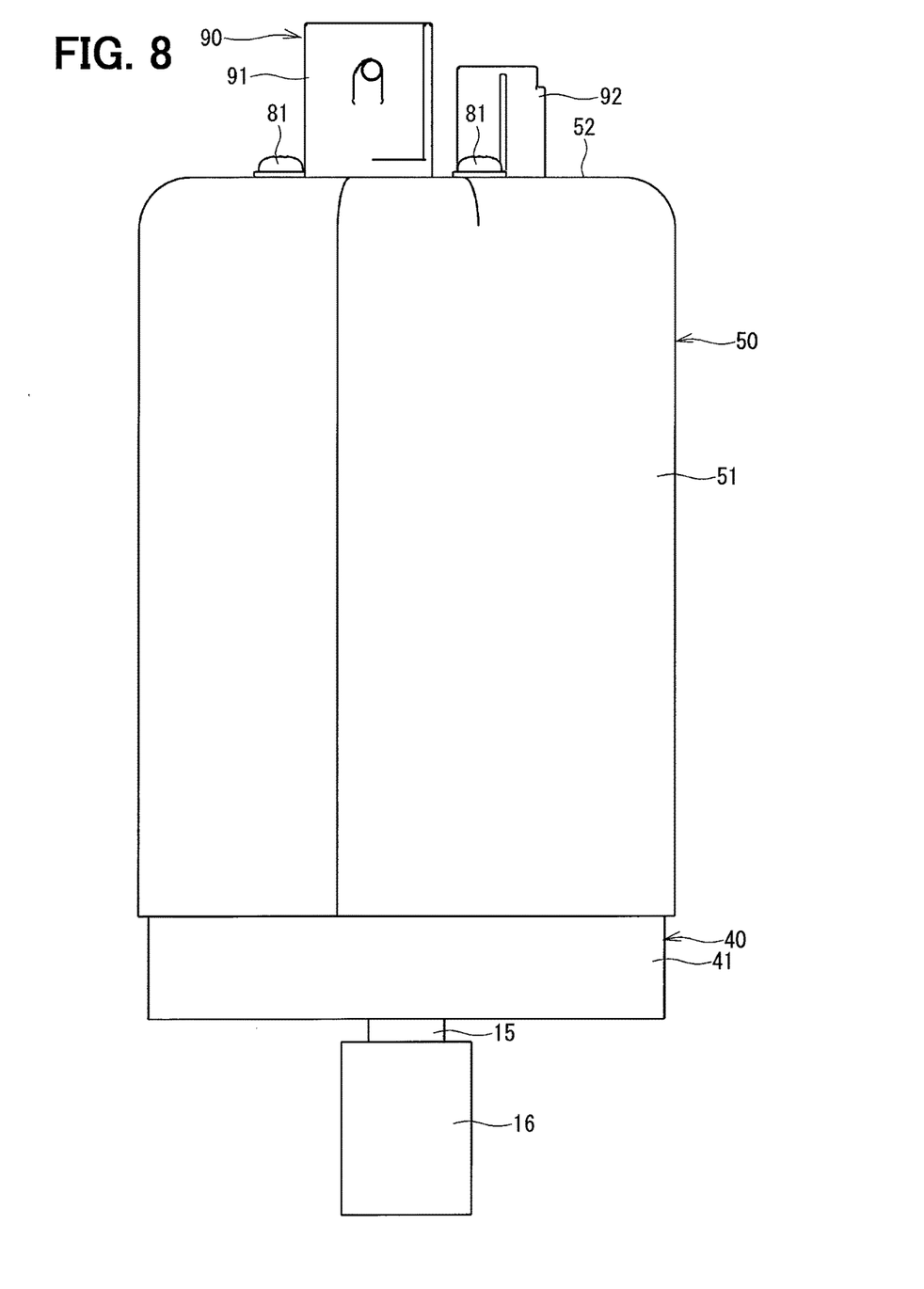
FIG. 8 is a view of the rotating electric machine in FIG. 7 along an arrow VIII.
Figure 9:
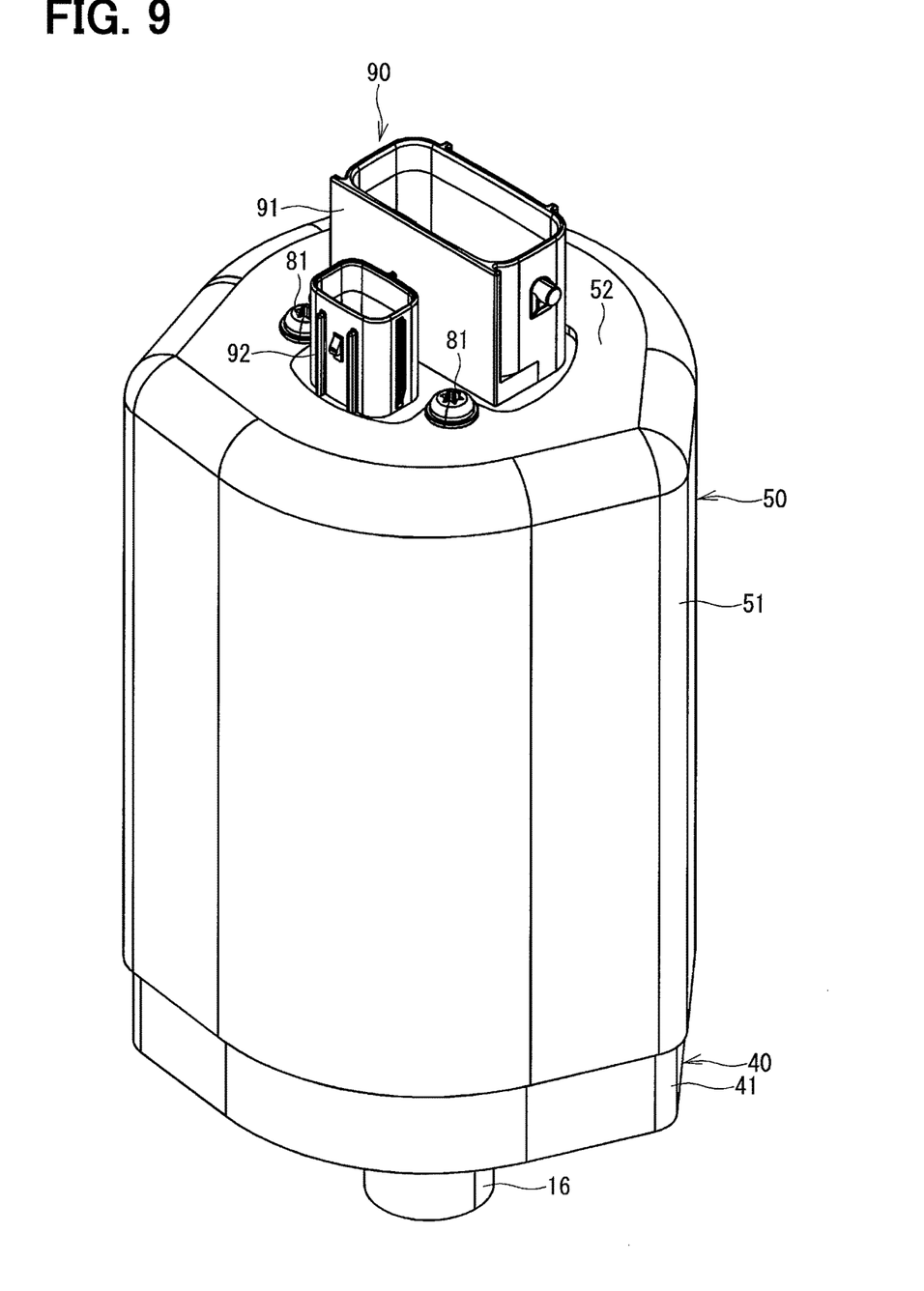
FIG. 9 is a perspective view of the rotating electric machine in the second embodiment of the present disclosure.

In the second embodiment, a structure of the second frame and other part are different from the first embodiment.

As shown in FIG. 6, in the second embodiment, the frame body 41 of the second frame 40 has a concave part 47, instead of having the through hole 46 in the first embodiment. The concave part 47 is formed on one side of the frame body 41 which is close to the motor section 10 (i.e., on a motor section side surface of the second frame 40). Further, the bolt 2 is inserted into the through hole 36 of the first frame 30 and an end of the bolt is fastened in a screw-fastened state into the concave part 47 so that the first frame 30 and the second frame 40 are fastened. Here, one end (i.e., a head) of the bolt 2 is stopped on one side, i.e., the cylinder part 37 side, of the frame body 31, and the other end of the bolt 2 (i.e., an opposite end relative to the head) is in a screw-fastened state into the concave part 47 of the frame body 41. Thereby, the motor case 14 is held in between the first frame 30 and the second frame 40 with the axial force of the bolt 2 exerted to a predetermined portion of the first and second frames 30, 40.

As for the bolt 2, except for a part around the other end (i.e., an opposite end relative to the head), most part along the shaft is positioned inside the cover body 51 (refer to FIG. 6). Further, the bolt 2 is entirely covered by the cover body 51 and the second frame 40, and the bolt 2 is thus not exposed to an outside of the rotating electric machine 1 (refer to FIGS. 6, 8, 9).

As described above, in the present embodiment, the first frame 30 has the through hole 36 which connects one surface close to the controller section 20 and the other surface close to the motor section 10. The second frame 40 has the concave part 47 formed on one side close to the motor section 10. Further, the bolt 2 is inserted into the through hole 36, fastening the first frame 30 and the second frame 40 with one end screw-fastened in the concave part 47. Here, the bolt 2 is entirely covered the cover body 51 and the second frame 40, i.e., is not exposed to an outside of the rotating electric machine 1. Therefore, rust prevention treatment is omissible from the bolt 2. Thereby, the manufacturing cost of the rotating electric machine 1 is reduced.

Further, in the second embodiment, there is no through hole disposed on the second frame 40 that allow communication between an inside and an outside of the rotating electric machine 1, such as the through hole 46 in the first embodiment, there is no chance of intrusion of dust, water etc., into the motor section 10 and/or the controller section 20 via such a hole (i.e., the through hole 46). Therefore, the structure in the second embodiment is more advantageous than the one in the first embodiment.

Other Embodiments

According to other embodiments of the present disclosure, a gap between the outer periphery of the frame body 41 of the second frame 40 and the cover body 51 or a gap between the outer periphery of the frame body 31 of the first frame 30 and the cover body 51 may be sealed by an annular shape sealing member that is elastically deformable.

Further, in other embodiments of the present disclosure, the motor case 14 may be seamlessly formed to have one body with the first frame 30 or with the second frame 40. In such case, the bolt 2 for fastening the first frame 30 with the second frame 40 is omissible.

In other embodiments of the present disclosure, the motor section 10 does not necessarily have the motor case 14. That is, even if the motor section 10 does not have the motor case 14, intrusion of dust, water, etc., into the motor section 10 is prevented by the cover 50.

Further, it is not necessary, in other embodiments of the present disclosure, to have the connector that protrudes from the lid section in a direction away from the controller section.

In other embodiments of the present disclosure, the cover 50 does not necessarily have the inner annular part 52.

In other embodiments of the present disclosure, the cover 50 may be fixed onto the lid section 60, the first frame 30 or onto the second frame 40 with other fastening device other than the screw member 81, such as caulking.

In other embodiments of the present disclosure, various parts may be chosen and adopted as the parts on the controller section 20 other than the heat sink 21 and the semiconductor module 22.

The present disclosure may be usable as a driving power source of other device other than the electric power steering device.

Although the present disclosure has been fully described in connection with preferred embodiment thereof with reference to the accompanying drawings, it is to be noted that various changes and modifications will become apparent to those skilled in the art, and such changes, modifications, and summarized scheme are to be understood as being within the scope of the present disclosure as defined by appended claims.

What is claimed is:

1. A rotating electric machine comprising:
a motor section including an annular stator, a winding wire wound on the stator, and a rotor rotatably disposed inside the stator;
a shaft disposed at a center of rotation of the rotor;
a controller section disposed in an axially non-overlapping position with the stator and controlling a supply of electric power to the winding wire which provides a drive control of the motor section;
a cover having a cylindrical shape that extends in an axial direction of the stator which seamlessly covers the controller section and the motor section; and
a lid section disposed on a side of the controller section that is opposite to the motor section and sealing an end part of the cover, wherein the lid section includes a lid body part disposed inside of the cover, and the lid body part is fastened to an inner annular part of the cover by a screw member located at the inner annular part.

2. The rotating electric machine of claim 1, further comprising:
a first frame disposed inside of the cover at a position between the motor section and the controller section;
a second frame disposed on an opposite side of the motor section relative to the first frame, in which the motor section is interposed between the first and second frames; and
a bolt that is inserted into and extends through at least one of the first frame and the second frame, the bolt fastening the first frame to the second frame, wherein the bolt has at least one axial end positioned inside the cover.

3. The rotating electric machine of claim 2, further comprising:
a through hole extending through the first frame and allowing communication between a controller section side surface of the first frame and a motor section side surface of the first frame; and
a concave part formed on a motor section side surface of the second frame, wherein
the bolt is inserted into the through hole and an end of the bolt is screw-fastened into the concave part which fastens the first frame to the second frame.

4. The rotating electric machine of claim 2, wherein
the bolt fastens the second frame to the first frame at an inside of the cover, and the bolt does not pierce through the second frame.

5. The rotating electric machine of claim 1, further comprising:
at least one of
(i) a power supply wire harness extending from the lid section in a direction that is opposite to the controller section, the power supply wire harness supplying electric power to the winding wire, or
(ii) a connection section connected to a control wire harness that transmits a signal to the controller section.

6. The rotating electric machine of claim 5, wherein
the connection section and the lid section are seamlessly formed into a single body from resin.

* * * * *